United States Patent [19]

Martin et al.

[11] 4,261,786
[45] Apr. 14, 1981

[54] MODULAR SERVICER

[75] Inventors: Joseph M. Martin, Leetonia; George E. Enders, Salem, both of Ohio

[73] Assignee: NRM Corporation, Akron, Ohio

[21] Appl. No.: 955,415

[22] Filed: Oct. 27, 1978

[51] Int. Cl.³ .......................................... B29H 17/14
[52] U.S. Cl. .................................. 156/406; 226/120; 226/196; 242/55; 242/55.3
[58] Field of Search ............... 156/394, 395, 405, 406; 242/55, 180, 186, 201, 55.3; 226/14, 120, 196, 198, 199

[56] References Cited

U.S. PATENT DOCUMENTS

| | | | |
|---|---|---|---|
| 3,413,174 | 11/1968 | Porter | 156/405 |
| 3,551,252 | 12/1970 | Bishop et al. | 156/406 |
| 3,600,252 | 8/1971 | Henley et al. | 156/406 |
| 4,105,488 | 8/1978 | Hayes et al. | 156/405 |
| 4,120,717 | 10/1978 | Rost | 156/405 |

Primary Examiner—John E. Kittle
Attorney, Agent, or Firm—Maky, Renner, Otto & Boisselle

[57] ABSTRACT

A modular tire building machine servicer for use with a tire component building drum is characterized by a plurality of stackable servicer modules stacked substantially along an arcuate path struck substantially about the axis of the drum, each module being capable of supplying and dispensing tire components to a tire building drum, such providing adaptability of the servicer for different applications, as well as facilitating loading and transportation of the same from one location to another, without changing the construction of the basic servicer module. Several banks of stacked servicer modules may be mounted on a shuttle module for multistation operation. Each servicer module has provision for supporting stock and liner take-up rolls and includes fixed and hingedly mounted component dispensing trays which when the modules are arcuately stacked, are all located proximate the tire building drum for application of components thereto. Each servicer module is easy to stack and width adjustable within each station with like side plates being interconnected at the distal ends of the outer legs of the side plates by adjustable telescoping beams which additionally provide for the interconnection of adjacent stacked modules. A simplified common drive is provided for the servicer modules which may be driven by the tire building machine or independently thereof. The servicer modules may also be provided with a plurality of optional modular components for flexibility in the ultimate design of the servicer without changing the basic modular unit.

33 Claims, 17 Drawing Figures

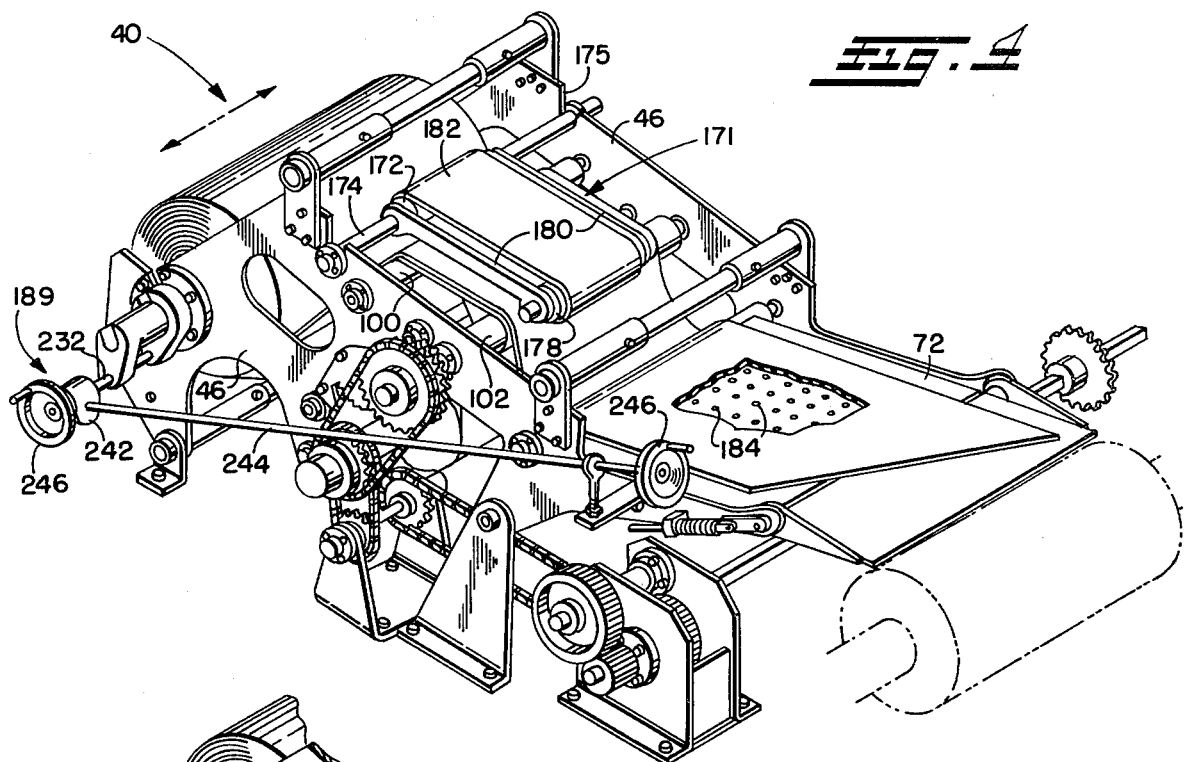
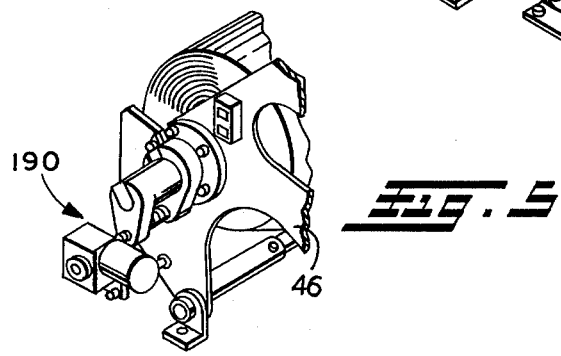
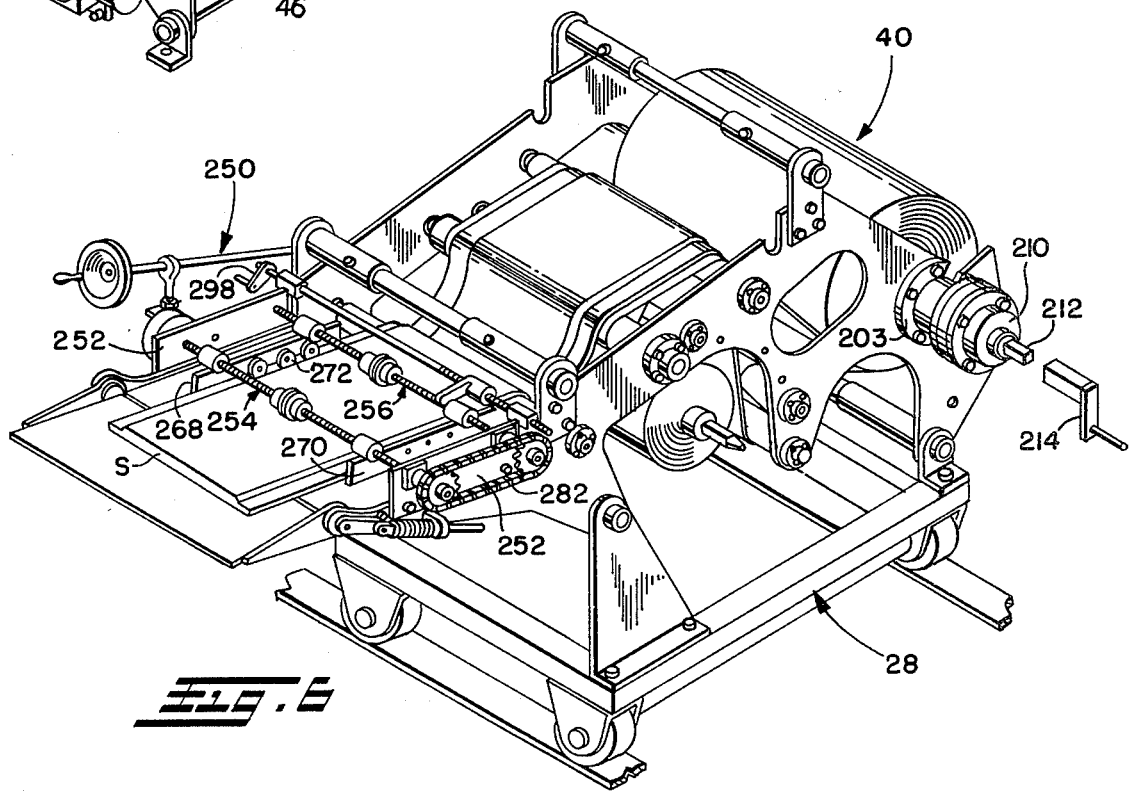

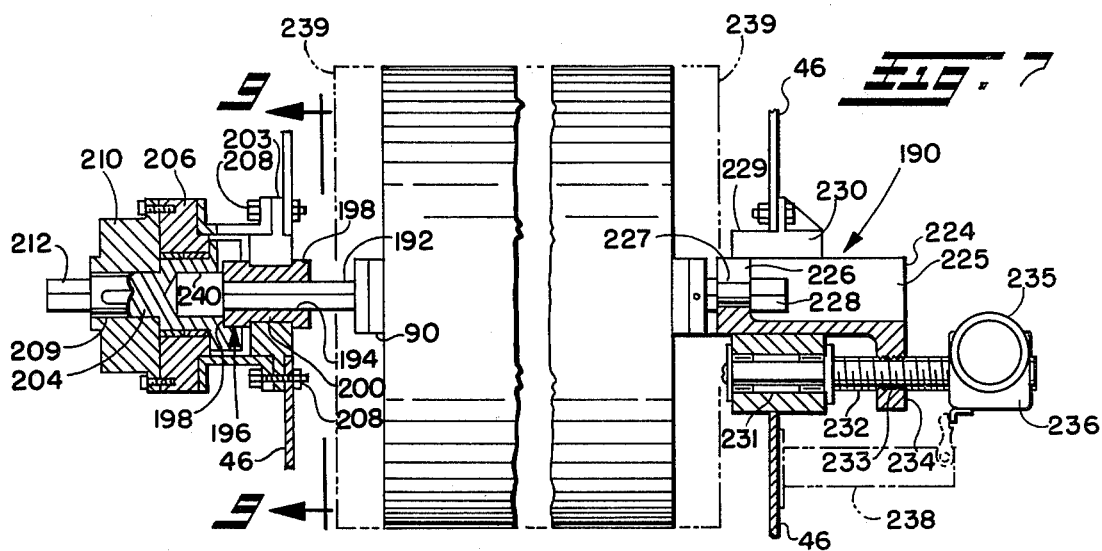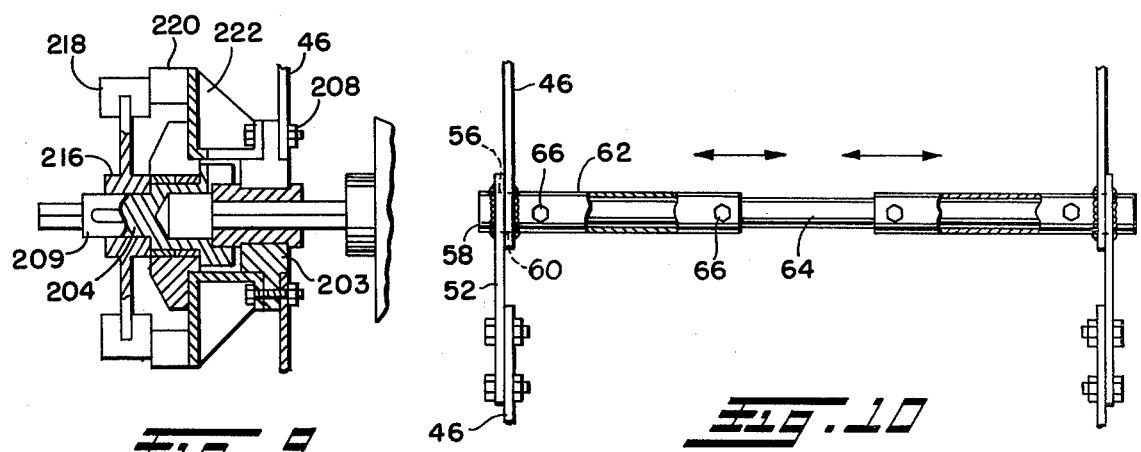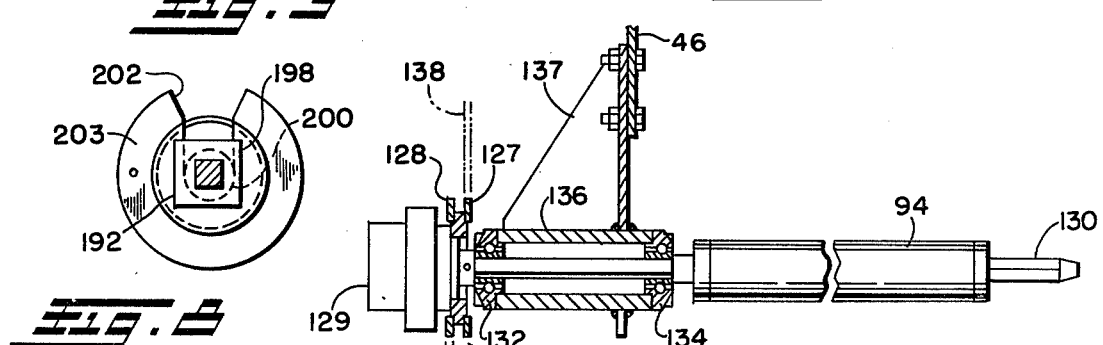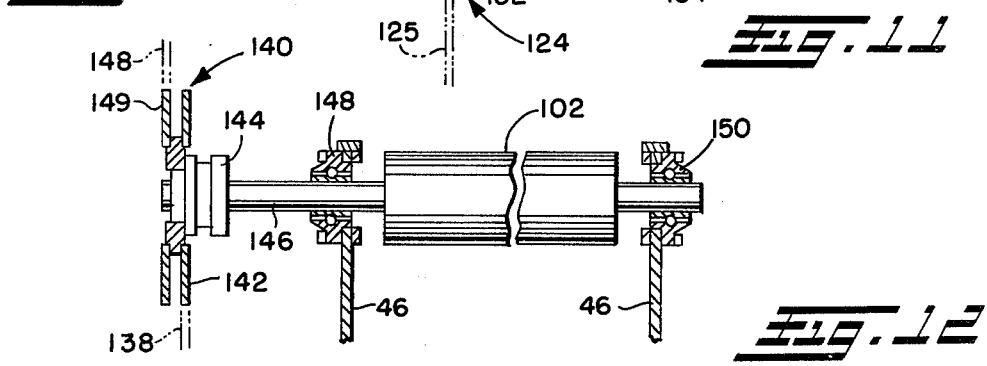

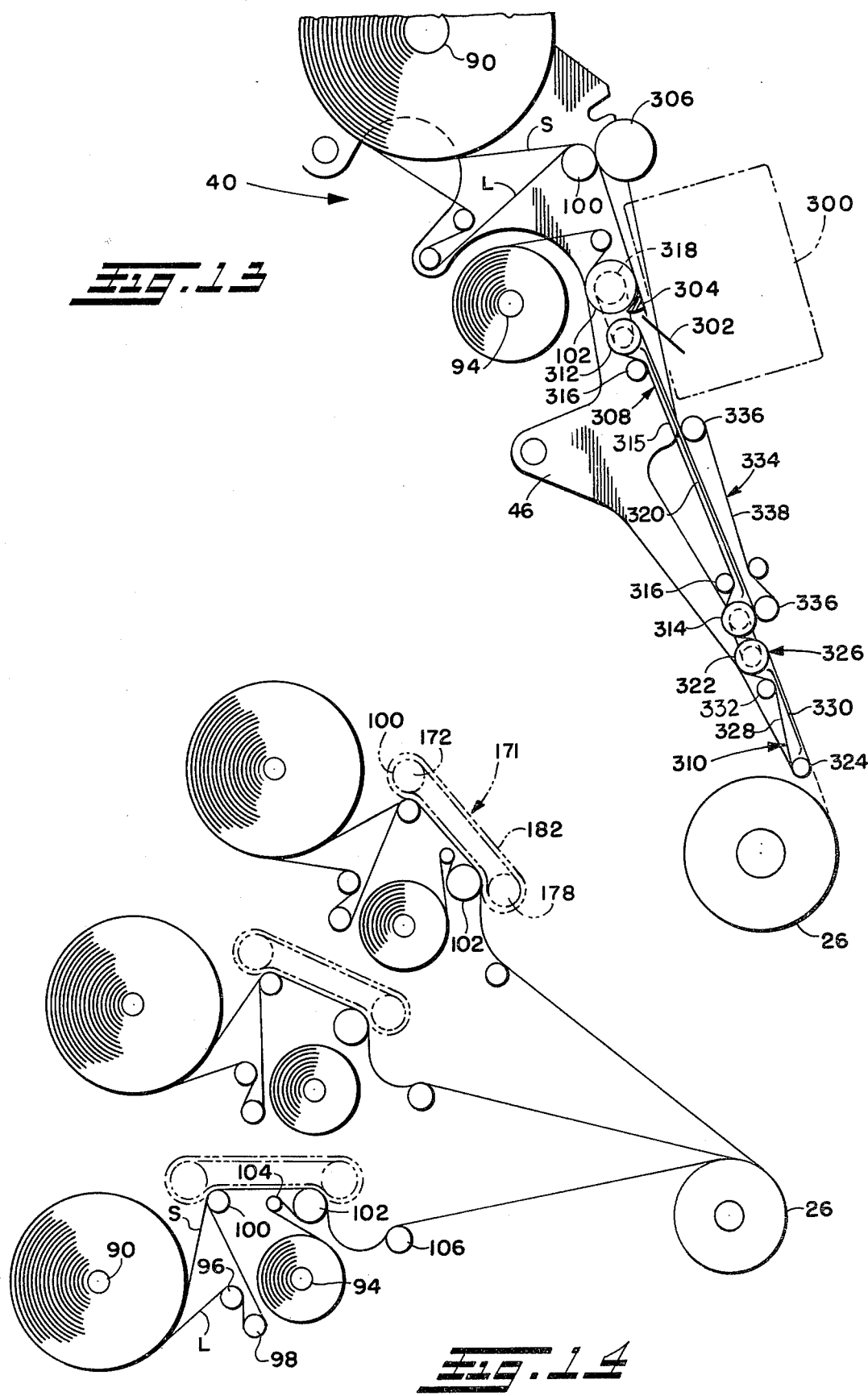

MODULAR SERVICER

FIELD OF THE INVENTION

This invention relates generally as indicated to a servicer and more particularly to a modular servicer for supplying tire components to a building drum or shaper for the construction of tires.

BACKGROUND OF THE INVENTION

In the construction of tires, the tire components from which the tires are built are generally stored in stock rolls between adjacent convolutions of a liner for later delivery by a tire component servicer to a tire building machine where the components are applied to an expansible drum or the like to build the tire carcasses. As many different types of tire carcasses, such as two-ply, four-ply, belted, radical, etc., can be built, each requires a different number of components, and thus, a different number of carriers for the components in a servicer. In addition, tires vary in size and so must the components therefor and different sizes of carriers for the components are required to accommodate the different sizes of components. Finally, substantial modification of the basic servicer construction may be required to equip the same with desirable optional components as required. Therefore, in the past, servicers were generally necessarily custom-made for each manufacturer of tires depending on the particular type or size of tire to be manufactured. Versatility, flexibility and adaptability heretofore generally have not been primary characteristics of known servicers. This not only added to the cost of prior servicers, but also has led to their premature obsolescence.

Moreover, many prior art servicers are extremely complex and occupy an inordinate amount of space. Such servicers could not be readily relocated from one location to another in a tire plant. Movement of the machine often must be accomplished in one piece or after difficult disassembly thereof.

SUMMARY OF THE INVENTION

To overcome such custom designing of servicers for particular applications, the present invention provides a modular servicer comprised of a plurality of readily stackable servicer modules, each module being capable of supplying tire components from stock rolls and dispensing the components to a tire building drum. Servicer modules are added or removed depending on the particular tire and method of manufacture being employed. If desired, a number of banks of stacked modules may be provided which are alternately indexed in registry with the tire building drum for multistation operation.

An important feature of the invention is that the servicer modules are stacked substantially along an arcuate path having its axis substantially coinciding with that of the tire building drum. Each servicer module comprises forward and rearward mounts for interconnecting adjacent stacked modules each respectively residing in arcuate paths having a common axis located forwardly of the servicer module.

Another important feature of the invention is the provision of a modular servicer with variable width capability for accommodating different widths of tire components for different sizes of tires. Such servicer modules are of simplified construction and comprise side plates which are interconnected by adjustable beams comprised of telescoping members. The beams additionally provide for interconnection between adjacent stacked modules. Thus a servicer of varying stock delivery capabilities may be readily assembled and/or modified. Preferably, the side plates are substantially M-shape having inner and outer legs, the side plates of each module being interconnected at the distal ends of the outer legs. Such shape facilitates assembly and installation and removal of a liner roll mounted between the side plates substantially coextensive with the space between the inner and one of the outer legs.

Yet another feature of the invention is the provision of a simplified common drive for the servicer modules which may be driven by the tire building machine or independently thereof during stock feed to the drum, with or without synchronous drive of the individual modules to match drum peripheral speed to stock feed mechanically.

A further important feature of the invention is the provision of a servicer that is constructed to receive any of a number of optional modular components thereon for flexibility in the ultimate design of the servicer without changing the basic modular unit.

Another further feature of the invention is the provision of such servicer having a compression spring counter-balance or air cylinder operation of distal, hinged, component dispensing trays.

Still another further feature of the invention is the provision of such servicer which may have air flotation of wide fabrics for minimal distortion and easy guiding.

Yet another further feature of the invention is the provision of such a servicer having substantially backward stripping to ensure that tacky stock is removed from the liner without undue stretching or distortion.

Still yet another feature of the invention is the provision of such a servicer having mechanical-automatic or manual center guiding of the stock.

Another important further feature is the provision of such a mechanical-automatic centering system utilizing a shaft having reversely threaded segments cooperating with ball nuts on respective guides for urging the latter towards the centerline of a servicer dispensing tray, the shaft being driven by a relatively constant torque spring motor.

Still another feature of the invention is the provision of such a servicer adaptable for use with or without a festoon.

Still another important feature of the invention is the provision of a servicer having a gravity weighted, single directional roller for use with a festoon to prevent retraction of the tail of the stock by the weight of the festoon.

A further important feature of the invention is the provision of a servicer having a traction conveyor assembly for facilitating and ensuring stripping of the stock from the liner and transfer of the stock.

Another significant feature of the invention is a servicer having manual or automatic centering of the stock roll.

Another feature of the invention is the provision of such a centering assembly for the stock roll having a captive bearing and drive therefor.

An additional feature of the invention is a servicer having automatic cut-off of components and synchronous conveying of the severed components to the tire building drum by fixed and hinged conveyors.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 4 is a perspective view of another modified form of servicer illustrating a floor mounted servicer including a manual centering assembly for the stock roll and a traction conveyor assembly;

FIG. 5 is a fragmented perspective view of a servicer module illustrating an automatic centering assembly for the stock roll;

FIG. 6 is a perspective view of still another modified form of servicer illustrating a servicer module mounted on a movable carriage which includes a mechanical-automatic, component centering assembly;

FIG. 7 is an enlarged, fragmentary, vertical section of a servicer module illustrating a stock roll cradle and brake assembly, and the automatic centering assembly for the stock roll;

FIG. 8 is an enlarged, fragmented, vertical section of the free end of the stock roll cradle taken substantially along the line 8—8 of FIG. 7;

FIG. 9 is an enlarged, fragmentary, vertical section of the free end of the stock roll cradle illustrating another form of brake assembly for the stock roll;

FIG. 10 is an enlarged, fragmentary, vertical section of the servicer module illustrating an adjustable beam therefor;

FIG. 11 is an enlarged, fragmentary, vertical section of the servicer module illustrating the drive for the liner take-up roll;

FIG. 12 is an enlarged, fragmentary, vertical section of the servicer module illustrating the drive for the drive roller;

FIG. 13 is a schematic illustration of a servicer module with a cutter assembly;

FIG. 14 is a threading diagram for the servicer module of FIG. 1 with the traction conveyor assembly of FIG. 4 schematically illustrated in phantom;

DESCRIPTION OF THE PREFERRED EMBODIMENTS

General Description Of The Servicer

Figure 1:
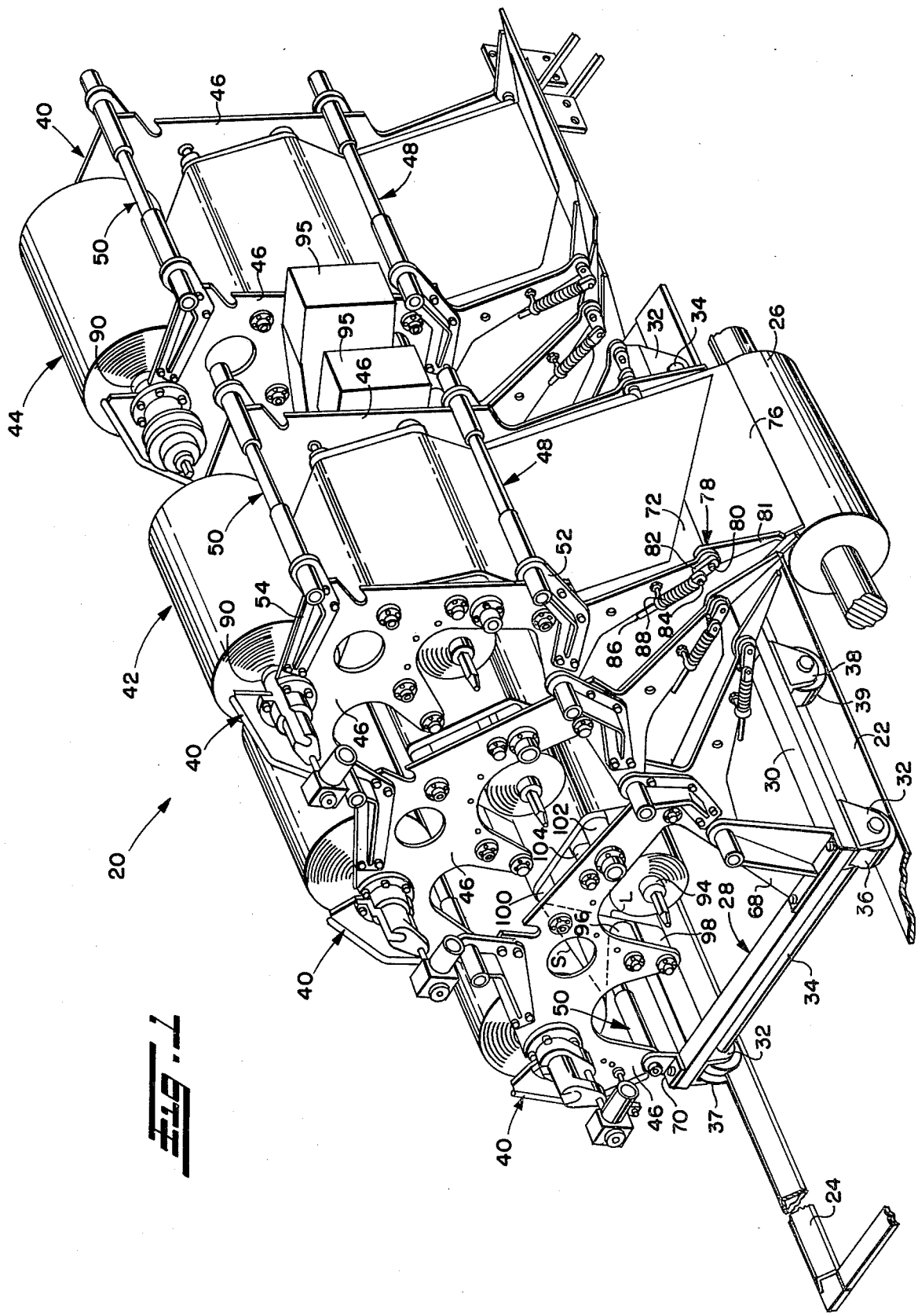
FIG. 1 is a perspective view of a modular servicer constructed in accordance with the present invention comprising two banks of stacked servicer modules mounted for multistation operation.

Referring now in greater detail to the drawings, and initially to FIG. 1, a servicer according to the invention is shown generally at 20 and includes a trackway formed by front and rear rails 22 and 24, respectively, which are mounted on the floor and extend in a direction parallel to the axial center line of a tire building drum indicated by reference numeral 26. The mounting for the drum and the driving equipment therefor may be of a conventional type. The trackway is of sufficient length to accommodate the transverse movement of a shuttle or carriage 28 between alternate stations or positions.

The carriage 28 comprises an open, rectangular base frame 30 having depending from the corners thereof downwardly opening U-shape brackets 32. Journaled between respective pairs of brackets are axles 34 with the axes thereof extending in a direction normal to rails 22 and 24. Each axle supports front and rear wheels 36 and 37, respectively, which travel along their respective rails 22 and 24. For added carriage support, additional brackets and wheels, such as bracket 38 and wheel 39 may be provided. To maintain the carriage 28 on its track, the rear wheels 37 are V-notched for mating engagement with the rear rail 24 which has a corresponding V-shaped upper rail surface. The carriage may be indexed manually along its track or automatically preferably by a suitable power drive.

Mounted on the carriage 28 for movement therewith is a plurality of servicer modules 40 each of which supplies tire components to the drum 26 for building of a tire carcass. The servicer modules are arranged in two banks or stations of three, generally designated by reference numerals 42 and 44, respectively, with the modules in each bank being stacked one upon the other substantially along an arcuate path having its axis substantially coinciding with that of the tire building drum 26. Additional modules may be readily added or modules readily removed as needed as will become more apparent as the description proceeds, the number of such modules employed depending on the number of different tire components required to build a particular tire carcass. Each bank of modules may be brought into successive registry with the drum 26 for application of the tire components carried by the modules of such banks.

The Servicer Modules

As each of the servicer modules 40 is of like construction, the following description will be applicable to all such modules.

Each module 40 comprises a pair of vertical side support plates 46 each having the same profile configuration which can be seen to be substantially M-shape, and between which the various rolls and rollers described below are journaled and/or supported. The side plates 46, having outer and inner legs, are adjustably interconnected at the distal ends of the outer legs by forward and rearward adjustable horizontal beams 48 and 50, respectively, which may be adjusted to vary the spacing between the side plates of the module as required for different sizes of components. Such horizontal beams also provide for the interconnection between adjacent stacked modules as well as for mounting the bottommost module on the carriage 28.

As best seen in FIGS. 1 and 10, each side plate 46 of each module 40 has fastened thereon front and rear dogleg brackets 52 and 54, respectively, the upper ends of which project beyond the side plate and have formed therein openings 56. Projecting outwardly from each bracket and concentric with openings 56 thereof are short tubular elements 58. Corresponding to each bracket 52 and 54 are openings 60 in the side plates of the next stacked module, which when assembled, are concentric with the openings 56 in the brackets 52 and 54. Projecting inwardly from the side plates and concentric with the openings 60 are tubular elements 62, such elements on opposed plates being aligned with one another when assembled. Telescopically received in and extending between each aligned pair of tubular elements 62 is cylindrical connecting member or rod 64 which may be fastened at its ends in the tubular elements by set screws 66. By sliding the tubular elements 62 inwardly or outwardly relative to the connecting rod, the width of the servicer may be varied. It should be understood that the connecting rod further extends through openings 60 and 56 into tubular element 58 and thus interconnects adjacent modules. With regard to the lowermost module, forward and rear brackets 68 and 70 are mounted on the carriage and support the distal ends of the connecting rods of the lowermost module, the connecting rod of the forward adjustable beam being at a higher elevation than that of the rearward adjustable beam. Such construction maximizes the number of modules that can be stacked by increasing the effective arcuate path of the rearward portions of the stacked modules.

Still referring to FIG. 1, knife-shape projections extend forwardly of the M-shaped body of the side plates of each module and support therebetween a fixed component dispensing tray 72. The knife-shape projections at their forward ends hingedly support an outer or distal component dispensing tray 76 at hinges 78 including pivot pin 80 secured to the outer tray side wall 81. Exteriorly of the side plates, each hinge pin has secured thereto a pivot arm as seen at 82. Pivotally connected at 84 at the distal end of pivot arm 82 is rod 86 around which is mounted coil spring 88 which urges the tray to its retracted position shown in connection with the modules of bank 44. The outer trays may readily be pulled down to the dispensing position as shown in connection with the modules of bank 42. Alternatively, a piston-cylinder assembly can be substituted for the compression spring and rod for actuation of the outer dispensing tray.

When in such dispensing position, the distal end of the outer tray preferably is adjacent and extends substantially tangentially to the drum. This is the same for each module. It will be appreciated that such positioning is obtained by having the axes of the corresponding adjustable beams of each module residing substantially in a cylindrical surface having its axis substantially concentric with that of the drum. In addition, the axes of the forward and rearward adjustable beams of adjacent stacked modules are arcuately equally spaced, respectively, and the arcuate spacing between the axes of the forward adjustable beams of adjacent stacked modules is less than that between the rearward adjustable beams of adjacent stacked modules. Regardless of the number of servicer modules stacked, the dispensing trays will be properly oriented with respect to the drum.

At the rearward end of each servicer module 40, a stock roll 90 is removably mounted between the side plates 46 in saddles in a manner to be described below in greater detail. Forwardly thereof is a liner take-up roll 94 which generally is much smaller than the stock roll 90 since the latter when it is full comprises the tire components such as belts, breakers or tread between adjacent convolutions of the liner. The take-up roll 94 is removably supported and driven by a take-up roll drive of the servicer drive assembly shown enclosed in a protective safety cover 95 and which is described below in greater detail. It can be seen in FIG. 1 that the respective drive assemblies for the banks 42 and 44 of servicer modules are located between the same to facilitate their interconnection. However, it should be understood that the drive assembly for each bank, or any of the modular components, may be located on either side of the servicer modules as required or desired.

Referring now additionally to FIG. 14 which illustrates schematically the threading of the stock and liner and the relationship of the various rolls and rollers which are mounted between the side plates 46, the liner L, for difficult to strip materials, passes from the stock roll 90, around two stripping rollers 96 and 98 and then around idler roller 100. The stripping rollers preferably are mounted between the inner legs of the M-shape side plates of each servicer module. The stock S, having been stripped from the liner also passes over the roller 100 along with the liner L and then over liner drive roller 102. From the liner drive roller, the liner L passes around idler roller 104 and then to the liner take-up roll 94. The idler roller 104 insures that the liner will wrap around the major extent of the surface of the liner drive roller 102 to insure positive drive of the liner. From the drive roller 102, the stock S hangs freely in a small loop or festoon between the drive roller 102 and idler roller 106 which is mounted on the side plates adjacent the fixed component tray 72. If desired, beater brushes adjacent the drive roller may be provided to assure that the stock is removed from the liner.

Servicer Drive Assembly

Figure 2:
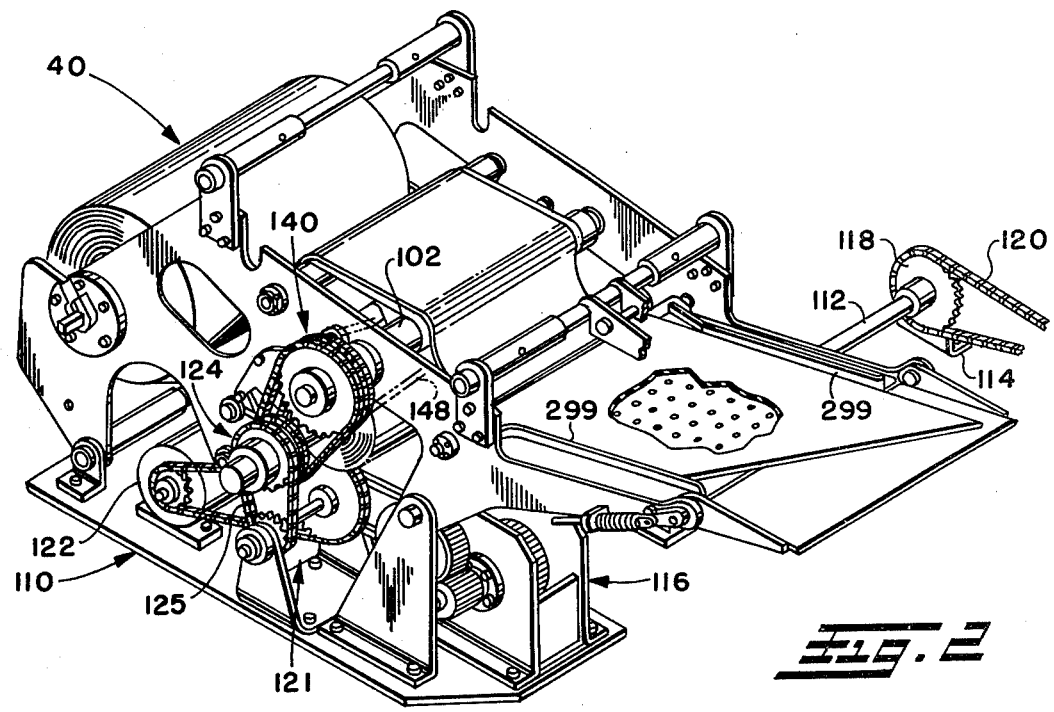
FIG. 2 is a perspective view of another variation of servicer comprised of a single servicer module mounted on the floor illustrating a common servicer drive assembly therefor and air flotation tray with manual centering guides.

Referring now to FIG. 2, which illustrates a single servicer module 40 fixedly mounted on the floor, a servicer drive assembly is designated generally by reference numeral 110. A drive shaft 112 is journaled between floor bracket 114 and quick change gear transmission 116 and is provided with a sprocket 118 which is driven continuously through chain drive 120 preferably by the tire building machine. The gear ratio of the transmission may be readily and quickly changed to coincide the feed rate of a component to that of the surface rate of speed of the drum. If a different set diameter of the drum is employed, the gearing of the transmission may be changed to obtain the desired dispensing speed.

The transmission 116, being driven by drive shaft 112, drives sprocket and axle assembly 121 which may alternately or additionally be driven by independent servicer drive motor 122. The sprocket and axle assembly 121 in turn drives take-up roller drive sprocket assembly 124 through chain drive 125.

As best seen in FIG. 11, the take-up roller drive sprocket assembly 124 comprises inner and outer sprockets 127 and 128, respectively, having the chain drive 125 trained about the outer sprocket 128. The sprocket assembly 124 is operatively coupled through an electromagnetic tooth-clutch shown at 129 to take-up roll support shaft 130 which is journaled at flange bearings 132 and 134 within hub 136 secured to the side plate 46 by bracket assembly 137. The take-up roll 94 may be easily installed or removed by sliding the same onto or off of the free end of the shaft 130 opposite the drive therefor. The take-up roll is preferably provided with central square bore which cooperates with the square shaft 130 for being driven by the same.

With the arrangement described, the sprocket assembly 124 will be continuously driven. When the clutch 129 is engaged, the sprocket assembly 124 is coupled to the take-up shaft 130 to drive the same and thus the liner take-up roll.

The inner sprocket 127 of the sprocket assembly 124 has trained thereabout drive chain 138 which drives drive roller sprocket assembly 140 as best seen in FIG. 12. The sprocket assembly 140 also is comprised of two sprockets with the chain 138 being trained about the inner sprocket 142. The sprocket assembly 140 is operatively coupled through an electromagnetic tooth-type clutch shown at 144 to the drive roller shaft 146 which is journaled at 148 and 150 between the vertical support plates 46. The sprocket assembly is continuously driven and by engagement of the clutch 144, the shaft 146 is driven and thus the drive roll 102.

In the event that additional modules are stacked upon the module shown in FIG. 2, the take-up roll and drive roller of such additional modules may be driven in like manner through chain drive 148 illustrated in phantom in FIGS. 2 and 12 which is trained over the outer sprocket 149 of the drive roller sprocket assembly 140 and the take-up roller sprocket assembly 124 of the next module. In such event, the drive roller and take-up roller sprocket rotated. The servicer operator selects the module from which the components are to be dispensed by selectively engaging the two electromagnetic clutches of such module.

As above described, the servicer may be synchronously driven through quick change gear transmission 116 by the tire building machine drive or alternatively driven by the independent servicer drive motor 122. In the latter event, such drive motor 122 may, in addition, synchronously drive the tire building drum through the quick change gear transmission 116 in reverse manner to that described above, thus eliminating the need for a separate drive for the tire building machine. Energization of the drive motor will effect rotation of the tire building drum 26 and synchronous feeding of stock from one of the servicer modules after selectively engaging the appropriate electromagnetic clutches of such module. In the event festoons or free loops are employed in the servicer modules, such as that subsequently described, either drive may be provided for filling of the festoon of a servicer module by selective engagement of the respective electromagnetic clutches. Thus, it can be appreciated that the modular construction of the servicer provides for versatility and adaptability in the servicer drive mode to suit a particular tire manufacturer's requirements without substantial reconstruction of the servicer.

Figure 3:
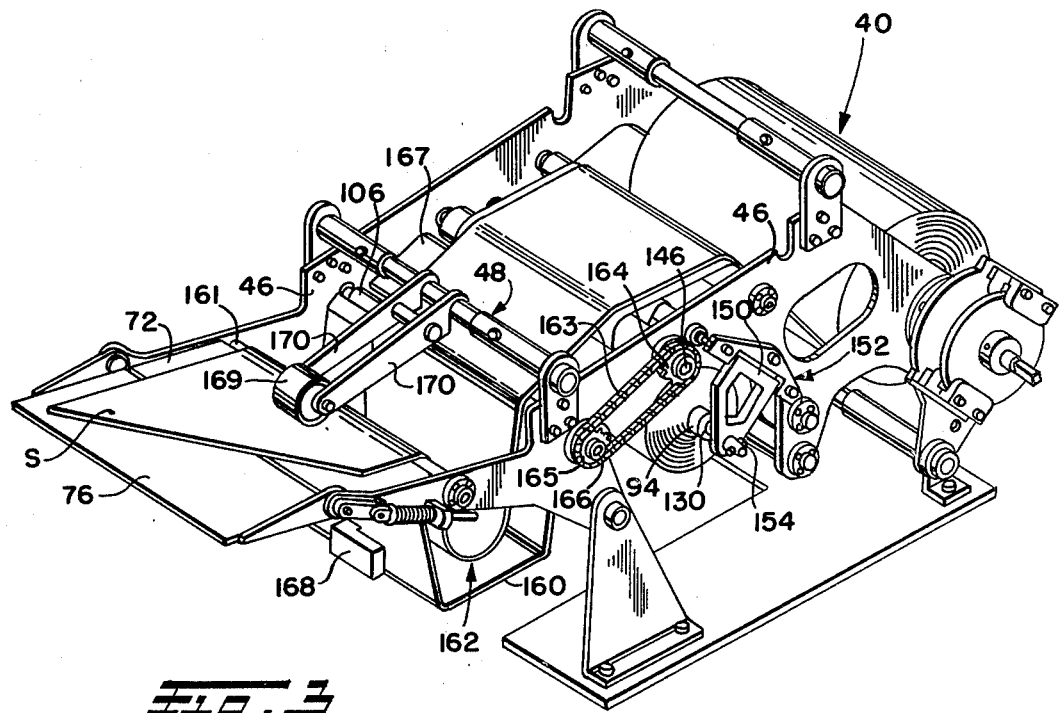
FIG. 3 is a perspective view of still another variation of servicer illustrating a floor mounted servicer module including a free loop assembly.
Figure 16:
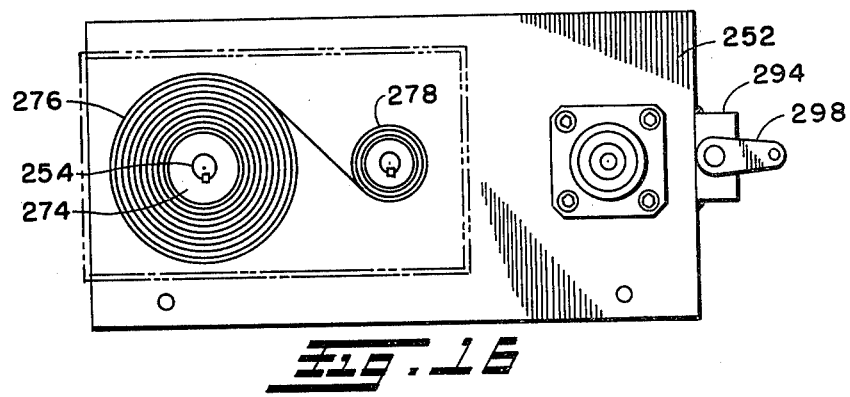
FIG. 16 is a side view of the centering assembly of FIG. 15 as seen from the line 16—16 thereof.
Figure 15:
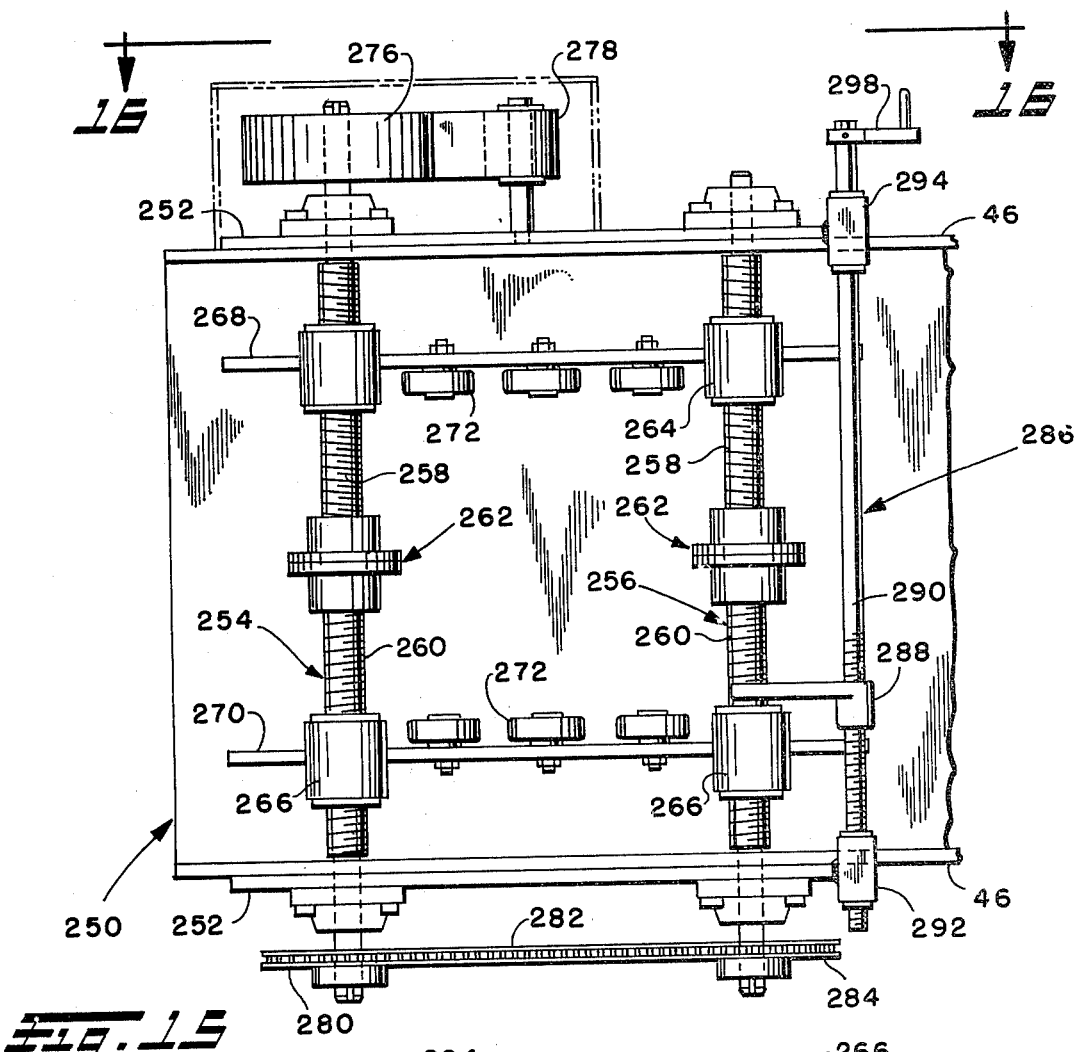
FIG. 15 is a fragmentary plan view of the servicer module of FIG. 6 illustrating in greater detail the centering assembly.

Referring now to FIG. 3, the outboard or free end of the take-up roll support shaft 130 may be supported in a swing bracket 150 hingedly mounted on the plate 46 at 152. The end of the shaft is preferably tapered for receipt in an opening provided in the bracket, and a suitable pin 154 may be provided to maintain the end of the shaft therein. To remove a full take-up roll, the pin 154 may be removed and the bracket 150 swung away to permit removal of the roll by sliding the same from roll support shaft 130. It should also be appreciated that the liner roll is coextensive with the space between the inner and outer legs of the M-shape body so that removal of the same may be had.

Free Loop Assembly

Still referring to FIG. 3, the servicer module 40 may be provided with U-shape trough 160 mounted between the side plates 46 intermediately the roller 106 and fixed component tray 72. Idler roller 161 may be provided adjacent the fixed component tray 72 such that the festoon or loop of stock generally indicated at 162 hangs in the trough between and from such idler roller and roller 106. To ensure positive feed of the stock to the festoon, the roller 106 preferably is driven by chain drive 163 trained about sprockets 164 and 165 mounted, respectively, on the liner roll drive shaft 146 and roller drive shaft 166 which is journaled between the side plates 46 and on which is mounted the roller 106. In addition, support plate 167 may be secured between the side plates 46 intermediately the liner drive roller and roller 106 to support the stock after it is stripped from the liner.

A detector such as a photocell device 168 is secured at the lower end of the trough 160. When the loop 162 of stock S extends within the path of the detector beam, the clutches 129 and 144 of the servicer drive 110 are disengaged to prevent further supplying of the stock. As the loop 162 is taken up as the component is dispensed onto the tire building drum, the detector causes the clutches 129 and 144 to engage. In this manner, a loop of a specified length may be automatically controlled and maintained at all times.

To prevent the loop from falling back into the trough from its own weight, a traction roller 169 is mounted at the distal end of spaced pivot arms 170 which are hooked at their other ends over the forward horizontal beam 48. The traction roller is uni-directional allowing stock only to be withdrawn towards the outer tray 76. The weight of the traction roller 169 may provide the necessary nip pressure between the roller 169 and the stock to prevent the tail of the latter from slipping or being drawn back by its own weight into the trough 160.

Traction Conveyor Assembly

Referring to FIG. 4, the servicer may also be provided with a traction conveyor assembly 171 spanning the idler roller 100 and drive roller 102 for difficult to strip stock. The traction conveyor assembly includes roller 172 supported on axle 174 extending between and secured in vertical slots 175 in the side plates 46. A second roller 178 is supported at the distal end of pivot arms 180 which are pivotally mounted at their rearward ends on the axle 174. A traction belt 182 is trained about the rollers 172 and 178.

As best seen in FIG. 14 which shows the traction assembly 171 in phantom, the spacing between the axes of the rollers 172 and 178 is greater than that between the axes of the idler roller 100 and drive roller 102 and such rollers 172 and 178 are positioned such that the traction belt 182 wraps at least partially around the rollers 100 and 102. The weight of the traction conveyor assembly causes the roller 178 to be urged downwardly tightening the belt 182 and providing sufficient nip pressure between the stock and the drive and idler rollers to prevent the stock from slipping relative thereto. The traction conveyor assembly assures positive traction between the component, liner and drive roller 102 and thus, difficult to strip stock S would not be drawn from stock roll 90 along with the liner L towards roller 96, but instead towards idler roller 102.

Air Flotation Assembly

Still referring to FIG. 4, it can be seen that the fixed component dispensing tray 72 may have provision for air flotation of the stock to ensure relatively friction-free movement across the same which provides easy guiding of the component for dispensing the same and minimum distortion therein. Such tray 72 may comprise an air chamber, only the upper surface of which is shown, such upper surface having a plurality of openings 184 through which air passes for supporting the component on an air cushion.

Stock Roll Cradle and Centering Assembly

Referring now to FIGS. 4-9, it will be seen that the stock roll 90 is supported in a cradle provided with a manual centering device designated generally at 189 in FIG. 4 or an automatic centering device designated generally by reference numeral 190 in FIG. 5.

As best seen in FIGS. 7 and 8, the free end of the square stock roll support shaft 192 supporting the stock roll 90 is received in a square bore 194 of an adapter 196. It will be appreciated below that the shaft is movable axially relative to the adapter by the shaft sliding in the bore 194. Moreover, different adapters with different sizes of bores 194 may be used to accommodate different sized shafts. The ends 198 of the adapter are also square in cross-section while the intermediate portion 200 is circular in section. The adapter 196 is received in the upwardly opening slot 202 of the saddle 203 with the circular portion 200 coinciding with the slot so that the adapter may rotate therein. The outer square end of the adapter is received in coupling member 204 journaled in a frame 206 secured to the vertical side plate along with the saddle 203 by fasteners 208. Operatively coupled to a reduced diameter portion 209 of the coupling member is an electrically operated brake assembly 210. The outer end 212 of the coupling member projects outwardly from the brake and is of square cross-section for manual (or automatic) rotation of the roller by means of a crank 214 seen in FIG. 6.

FIG. 9 shows an alternative free end support assembly substantially the same as illustrated in FIG. 7 however employing a disc brake assembly in place of the brake 210 shown in FIG. 7. The coupling member 204 has keyed thereto at its reduced diameter portion 209 a brake disc 216 which moves within brake element 218 secured to bracket 220, in turn secured to the support frame 222 mounted on the side plate 46 along with saddle 203 by fasteners 208. The brakes, in either case, act as drags preventing excessive rotation of the stock roll in either direction during removal of the stock therefrom.

Centering of the stock roll 90 may be provided by the captive bearing and drive, automatic centering assembly 190 comprising captive bearing 224 having upwardly opening large slot 225 and smaller bearing slot 226 therein which receive the end of the square shaft 192 opposite the free end support, such shaft end having a rounded portion 227 thereon coinciding with the bearing slot 226 for free rotation of the stock roll and a square end portion 228 coinciding with the large slot 225, such square end portion providing an interlock between the shaft and the captive bearing 224 for common lateral movement. The captive bearing 224 is slidably mounted in a housing 229 secured to the side plate 46. The housing 229 has an upwardly opening slot 230 aligned with the slots 225 and 226 in the captive bearing 224 to permit insertion of the shaft. Also in the housing is a bore 231 in which is journaled the end of a threaded shaft 232 which extends through threaded bore 233 in a depending arm portion 234 of the captive bearing 224 and has supported at the end thereof a motor 235 and reducing gear box 236 for automatic centering of the stock roll. The gear box and motor are precluded from rotation by an additional bracket or rod 238 secured to the side frame 46.

Rotation of the threaded shaft by the motor 235 through gear box 236 will cause the cradle to move transversely along the shaft thus laterally moving the stock roll 90 to center the same. The extent of such lateral movement both to the left and right is indicated in phantom lines at 239 in FIG. 7. It will be appreciated that the shaft 192 will freely move relative to the adapter 196 and a clearance bore 240 is provided in the coupler 204 to permit movement of the shaft to the left as seen in FIG. 7.

Referring back to FIG. 4, the threaded shaft 232 instead may be rotated manually by centering device 189. In place of the motor 234 and reducing gear box 236 of the automatic centering assembly 190, a gear box 242 is driven by manual rotation of wheel 244 proximate the same or by manual rotation of remote wheel 246 through coupling shaft 248 for rotation of the shaft 232 in the above described manner.

Mechanical-Automatic Center Guide Assembly

Figure 17:
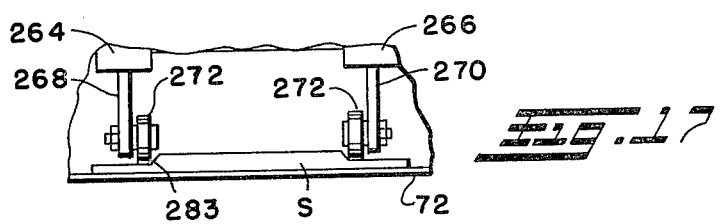
FIG. 17 is a fragmentary end view of the servicer module of FIG. 6 illustrating in greater detail the employment of the centering assembly with tread stock.

Referring now to FIGS. 6, 15, 16, and 17, it will be seen that the servicer module 40 may be provided with a mechanical-automatic center guide assembly 250. The guide assembly includes spaced-apart plates 252, each being fastened to the side plates 46 of the module 40 at the knife-like projections and projecting upwardly therefrom. Journaled between the plates 252 are threaded shafts 254 and 256, each shaft having reversely threaded segments 258 and 260 secured together by a flange coupling 262. Each of the segments 258 and 260 is received respectively in a corresponding ball screw 264 and 266 from which depend respectively guides 268 and 270. Each guide supports a plurality of rollers 272 which project beyond the lower edge of the supports as best seen in FIG. 17.

Coupled through a single direction clutch drive 274 to the threaded shaft 254 is a spool or reel 276 on which is wound the strip of a substantially constant torque spring motor 278. Mounted on the other end of the threaded shaft 254 is a sprocket 280 which drives through chain 282 a sprocket 284 mounted on the end of the threaded shaft 256 for driving of the latter. A cover, outlined in phantom lines at 285 in FIG. 15 and 16 may be provided for the spring motor and reel.

It should be appreciated that the motor 278 causes the threaded shafts to rotate urging the shoulder guides 268 and 270 toward the center of the tray with substantially constant force. When a tire tread component is being centered, the guide rollers 272 are preferably spaced from the tray about the thickness of the lateral sides of the stock such that the rollers ride along the component with the rollers being urged inwardly against the shoulders 283 of the center tread portion as best seen in FIG. 17. This serves to center and maintain contact of the component with the fixed tray 72 even as the operator places the component on the drum for winding thereon.

In order to minimize excess travel of the guides 268 and 270, mechanical stop 286 is provided. Such stop includes a threaded ball nut 288 threaded on screw 290 which is journaled between the plates 252 at 292 and 294. The nut 289 includes a stop arm 296 adapted to engage, and thus restrict movement of the ball nut 226 on the shaft 256 minimizing excess travel. Rotation of the screw 290 may be had by crank 298 at one end of the screw to adjust the position of the stop.

In place of the automatic centering system above described, manual centering guides 299 may be slidably mounted on the fixed tray as shown in FIG. 2.

Component Cutter Assembly

Referring now to FIG. 13, a cutter module 300 comprising rotary knife 302 is schematically illustrated and mounted on the side plates 46 of the servicer module 40 proximate the liner drive roller 102. A stripper and stock support 304 extends the length of the drive roller and has a knife edge for separating the stock from the liner, the latter of which substantially surrounds the drive roller. The stock is guided along the relatively flat top surface of the support 304 and overhangs the edge thereof opposite the knife edge where it is severed therealong by the knife. The member and knife may be adjusted for either straight or bias cuts. Precise lengths of stock are measured by counter roller 306 mounted adjacent idler roller 100, the counter roll 306 being driven by the stock as it passes over the roller 100. The counter roll, through suitable means, will automatically actuate the cutter module after a desired length of stock is measured.

The severed stock is carried for application to the drum 26 by a fixed component conveyor 308 and finally by hinged component dispenser conveyor 310 which are positioned similar to the above described fixed and hinged component trays.

The fixed component conveyor comprises a pair of rollers 312 and 314 about which are trained a conveyor belt 316, the roller 312 being located proximate the drive roller 102 and the roller 314 adjacent the hinged conveyor 310. Idler rollers 316 insure that the belt 316 will wrap around the major extent of the surface of the rollers 312 and 314. The roller 312 adjacent the drive roller is synchronously driven thereby through sprocket and chain assembly 318. A backing plate 320 may be provided to support the belt and the stock carried thereby.

The hinged component conveyor 310 includes proximate and distal rollers, 322 and 324, respectively, the former of which is synchronously driven by roller 314 through sprocket and chain assembly 326. Trained about the rollers 322 and 324 is a conveyor belt 328 and a backing plate 330 may be provided to support the same. Idler roller 332 insures that the belt 328 will wrap around the major extent of the surface of the roller 322 to insure positive drive of the conveyor belt.

To insure that the stock is transported by the fixed conveyor, a traction conveyor assembly 334 is provided opposite the fixed conveyor 308. Such assembly includes rollers 336 about which is trained traction belt 338.

It can now be seen that the stock may be automatically cut-off at desired lengths thereof and the severed components are synchronously conveyed to the tire building drum by the fixed and hinged conveyors.

We claim:

1. A modular tire component servicer for use with a tire component building drum comprising a plurality of stacked servicer modules, each module supporting the next above module and comprising dispensing means for a tire component and means to convey such tire component to said dispensing means for application of such component to the drum.

2. The servicer of claim 1 wherein said servicer modules are stacked substantially along an arcuate path.

3. The servicer of claim 2 wherein said arcuate path is struck substantially about the axis of such drum.

4. The servicer of claim 3 wherein said dispensing means of each servicer module extends substantially tangentially to the circumferential surface of such drum.

5. The servicer of claim 1 wherein each servicer module includes forward and rearward mounting means for interconnecting adjacent stacked modules.

6. The servicer of claim 5 wherein said forward and rearward mounting means reside substantially in respective arcuate paths struck about a common axis located forwardly of said servicer modules.

7. The servicer of claim 6 wherein said forward and rearward mounting means of adjacent stacked modules are arcuately equally spaced, respectively, and the arcuate spacing between said forward mounting means of adjacent stacked modules is less than that between said rearward mounting means of adjacent stacked modules.

8. The servicer of claim 7 comprising a frame supporting the lowermost servicer module of said plurality of stacker servicer modules with the forward mounting means of said lowermost servicer module at an elevation greater than that of the rearward mounting means of said lowermost servicer module.

9. The servicer of claim 1 wherein said servicer modules are substantially of like construction.

10. The servicer of claim 1 wherein said dispensing means are proximate one another and vertically spaced.

11. The servicer of claim 1 wherein said dispensing means comprises a tray and said tray is adapted to be positioned substantially tangentially to the circumferential surface of such drum.

12. The servicer of claim 11 wherein said dispensing means comprises an air flotation tray.

13. The servicer of claim 1 wherein said dispensing means comprises a proximal and distal tray, said distal tray being hinged for movement to and from an operative position.

14. The servicer of claim 13 wherein said proximal tray includes air flotation means.

15. The servicer of claim 1 wherein each servicer module includes a stock roll and liner roll.

16. The servicer of claim 15 comprising means for stripping the stock from the liner.

17. The servicer of claim 1 wherein said servicer modules are stacked in adjacent banks of modules and said banks of modules are mounted on carriage means movable between alternate positions, the modules of one of said banks being aligned with the tire building drum in one of said alternate positions, while the modules of the other of said banks are aligned with the drum when in the other of said alternate positions.

18. The servicer of claim 1 wherein each servicer module comprises a pair of spaced apart, vertical side plates and means for adjustably interconnecting together said side plates whereby the spacing therebetween can be varied to accommodate different component widths.

19. The servicer of claim 18 wherein said vertical side plates are substantially M-shape having inner and outer legs.

20. The servicer of claim 19 wherein said vertical side plates of each module are interconnected at the distal ends of said outer legs.

21. The servicer of claim 20 comprising a stock roll and liner roll mounted between said side plates, said liner roll being disposed intermediately said inner leg and one of said outer legs whereby said liner roll can be removed.

22. The servicer of claim 21 comprising stripping means for stripping positively the liner from the stock, said stripping means being mounted between said inner legs of said side plates.

23. The servicer of claim 18 wherein said means for adjustably interconnecting comprises at least one telescoping beam.

24. The servicer of claim 23 wherein said telescoping beam comprises a tubular member secured to each of said vertical side plates and a connecting rod telescopically received in and interconnecting both said tubular members.

25. The servicer of claim 18 wherein said means for adjustably interconnecting further provides the interconnection between adjacent stacked modules.

26. The servicer of claim 25 wherein said means for adjustably interconnecting comprises a telescoping beam extending between said side plates of one of said servicer modules and at its ends supporting said one of said servicer modules on the next lower servicer module.

27. The servicer of claim 26 wherein said next lower servicer module includes brackets secured to its side plates, said brackets including means for supporting said ends of said telescoping beam.

28. The servicer of claim 27 wherein said telescoping beam includes an inner telescoping member, and said means for supporting includes tubular elements on said brackets for receiving the ends of said inner telescoping member.

29. The servicer of claim 1 comprising common drive means for said servicer modules.

30. The servicer of claim 29 comprising a liner drive roller and a liner take-up roll and wherein said drive means includes clutch means for operatively connecting said drive roller and take-up roll with said common drive means.

31. The servicer of claim 30 wherein said liner drive roll is supported at one end by said drive means and at its other end by hinged support means operative in one position to support said other end and in another position to allow removal of said liner drive roll.

32. The servicer of claim 1 wherein each servicer module includes a stock roll, liner take-up roll, means for stripping the liner from the stock, an idler roller over which the stock and liner pass after the liner has been stripped from the stock, a liner drive roller, and a traction conveyor spanning said idler and liner drive rollers and cooperating therewith to ensure positive traction between the stock, idler roller and drive rollers.

33. The servicer of claim 32 wherein said traction conveyor includes a pair of rollers and a belt trained about said rollers, and said belt at least wraps partially around said idler and drive rollers.

* * * * *